US012673854B2

(12) United States Patent (10) Patent No.: US 12,673,854 B2
Soper et al. (45) Date of Patent: Jul. 7, 2026

(54) COUNTERWEIGHT TRAY RETENTION SYSTEM FOR LIFTING MACHINE AND RELATED METHODS

(71) Applicant: LINK-BELT CRANES, L.P., LLLP, Lexington, KY (US)

(72) Inventors: Andrew Soper, Lexington, KY (US); John Borwig, Lawrenceburg, KY (US); Cody Brown, Lexington, KY (US); Joey Goodin, Lexington, KY (US); Will Draper, Lexington, KY (US)

(73) Assignee: LINK-BELT CRANES, L.P., LLLP, Lexington, KY (US)

( * ) Notice: Subject to any disclaimer, the term of this patent is extended or adjusted under 35 U.S.C. 154(b) by 213 days.

(21) Appl. No.: 18/205,810

(22) Filed: Jun. 5, 2023

(65) Prior Publication Data

US 2023/0391589 A1 Dec. 7, 2023

Related U.S. Application Data

(60) Provisional application No. 63/348,764, filed on Jun. 3, 2022.

(51) Int. Cl.
*B66C 23/74* (2006.01)
*B60R 11/00* (2006.01)
*F16B 21/02* (2006.01)

(52) U.S. Cl.
CPC .............. *B66C 23/74* (2013.01); *B60R 11/00* (2013.01); *F16B 21/02* (2013.01); *B60R 2011/004* (2013.01); *B60R 2011/0052* (2013.01)

(58) Field of Classification Search
CPC ......... B66C 23/72; B66C 23/74; B60R 11/00; B60R 2011/004; B60R 2011/0052; F16B 21/02
USPC ...................................................... 248/205.1
See application file for complete search history.

(56) References Cited

U.S. PATENT DOCUMENTS

| | | | | |
|---|---|---|---|---|
| 3,419,156 A | * | 12/1968 | Mork ....................... | B66C 23/74 212/178 |
| 5,524,777 A | * | 6/1996 | Weber ..................... | B66C 23/74 212/178 |
| 11,097,927 B1 | | 8/2021 | Draper et al. | |
| 2005/0220568 A1 | * | 10/2005 | Fink ........................ | F16B 21/02 411/553 |
| 2008/0173606 A1 | * | 7/2008 | Willim .................... | B66C 23/74 212/195 |
| 2013/0287486 A1 | * | 10/2013 | Tseng ........................ | F16B 5/10 403/314 |
| 2018/0051735 A1 | * | 2/2018 | Stenyakin ............... | F16B 21/09 |
| 2020/0191188 A1 | * | 6/2020 | Carper .................... | F16B 21/08 |
| 2022/0081264 A1 | * | 3/2022 | Eberhardt ............... | B66C 23/74 |

(Continued)

*Primary Examiner* — Christopher Garft
(74) *Attorney, Agent, or Firm* — Dickinson Wright PLLC; Andrew D. Dorisio

(57) ABSTRACT

A system for retaining a counterweight tray adapted for connection to a lifting machine includes a retainer adapted for connecting the counterweight tray to the lifting machine in one orientation and releasing the counterweight tray from being connected to the lifting machine in another orientation. The counterweight tray may include an opening, and the retainer may be adapted for passing through the opening in the counterweight tray in one orientation and retained thereto in another orientation. Related methods are also disclosed.

16 Claims, 7 Drawing Sheets

(56)                         References Cited

U.S. PATENT DOCUMENTS

2022/0362614 A1*  11/2022  Bugeaud ............ A63B 21/0442
2023/0183047 A1*   6/2023  König ..................... B66C 23/74
                                                          212/195

* cited by examiner

COUNTERWEIGHT TRAY RETENTION SYSTEM FOR LIFTING MACHINE AND RELATED METHODS

This application claims the benefit of U.S. Provisional Patent Application Ser. No. 63/348,764, filed Jun. 3, 2022, the disclosure of which is incorporated herein by reference.

TECHNICAL FIELD

This disclosure relates generally to lifting machines and, more particularly, to a counterweight tray retention system for a lifting machine, such as a crane, and related methods.

BACKGROUND

Lifting machines and, in particular, cranes, typically include a counterweight that serves to balance the load being lifted. The counterweight typically comprises one or more plates supported by a tray. The tray may be secured to the crane superstructure, which may be done in a releasable manner to allow for selective removal. An example is shown in commonly owned U.S. Pat. No. 11,097,927, the disclosure of which is incorporated herein by reference.

Past arrangements for securing the tray in place on the crane when not in use suffer from undue complexity, and may require significant effort to deploy or release. Moreover, it is typical for such arrangements to provide for multiple points of connection, which in some cases may further contribute to the complexity. Known connection systems also rely on arrangements with many parts, which increases the risk of loss.

Accordingly, a need is identified for a counterweight tray retention system that is simple and inexpensive to implement and use, and contributes to an overall increase in efficiency in terms of operation of a lifting machine, especially during times when the tray is not in use.

SUMMARY

According to a first aspect of the disclosure, a system for retaining a counterweight tray adapted for connection to a lifting machine is provided. The system includes a retainer adapted for connecting the counterweight tray to the lifting machine in one orientation but releasing the counterweight tray from being connected to the lifting machine in another orientation.

In one version, the retainer includes one or more lugs, such as two opposed lugs. The two opposed lugs may be provided on a lower portion of the retainer. The lugs are adapted to fit within a corresponding slot associated with a deck of the lifting machine.

The retainer may include a handle and a projection adapted for receiving a locking pin. The retainer may further include an oversized portion adapted for engaging the counterweight tray when another portion of the retainer is passed through an opening formed in the counterweight tray.

According to a further aspect of the disclosure, a retention system for a lifting machine is provided. The system comprises a counterweight tray including an opening and a retainer adapted for passing through the opening in the counterweight tray in one orientation but being retained in another orientation.

In one version, the opening is located centrally on the counterweight tray. The opening is shaped to allow for rotation of the retainer in only one direction. The retainer may form a single point of retention for the counterweight tray.

The retainer may include one or more lugs, such as two opposed lugs. The two opposed lugs may be provided on a lower portion of the retainer and adapted to pass through the opening in the counterweight tray into engagement with slots formed in the deck when the retainer is in the other orientation. In this or other versions, the retainer includes a handle and may further include a projection adapted for receiving a locking pin.

Still a further aspect of the disclosure comprises a method for retaining a counterweight tray on a lifting machine. The method comprises passing a retainer through an opening in the counterweight tray in a first orientation. The method may further comprise rotating the retainer to a second orientation to secure the counterweight tray to the lifting machine. Still further, the method may include the step of locking the retainer in the second orientation.

BRIEF DESCRIPTION OF THE DRAWING FIGURES

DETAILED DESCRIPTION OF THE PREFERRED EMBODIMENT

Figure 1:
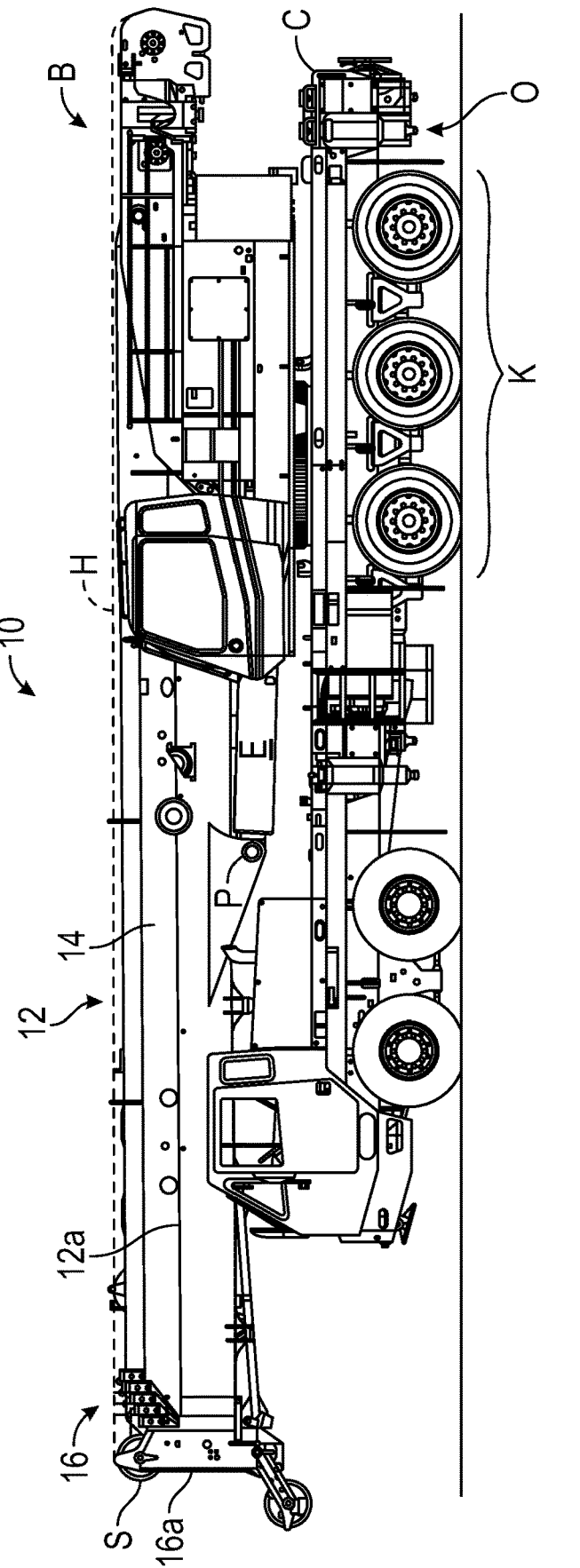
FIG. 1 is a side view of a lifting machine in the form of a crane.

Reference is now made to FIG. 1, which provides an overall view of a crane 10 for which the aspect of this disclosure may have utility. In the embodiment illustrated in FIG. 1, this crane 10 includes a main boom assembly 12 having at least two generally tubular boom sections 14, 16. The first or outer base boom section 14 is pivotally mounted on a bodily rotatable or slewing superstructure or base B. The base B in turn is supported by a chassis C having ground-engaging structures (e.g., wheels K for over-the-road travel; outriggers O when stationary and operative for lifting loads).

The second boom section 16 is telescopically received within the first or base boom section 14 and includes a head end 16a of the boom assembly 12. It should be appreciated that additional boom sections may be telescopically received within the second boom section 16 and so on to form intermediate sections of the boom assembly 12 when extended. An internal hydraulic cylinder (not shown) is provided to move the telescoping boom sections 14, 16 relative to each other in a manner known in the art.

A lifter, such as a boom hoist external cylinder E, pivots the entire boom assembly 12 in a vertical direction at a connection point P. A hoist rope H, such as a cable, is also connected to a hoist at one end of the crane 10. The rope H extends over a sheave S at the head end 16*a*, and thus may be used in connection with the raising and lowering of the boom assembly 12 to carry and move loads.

Figure 2:
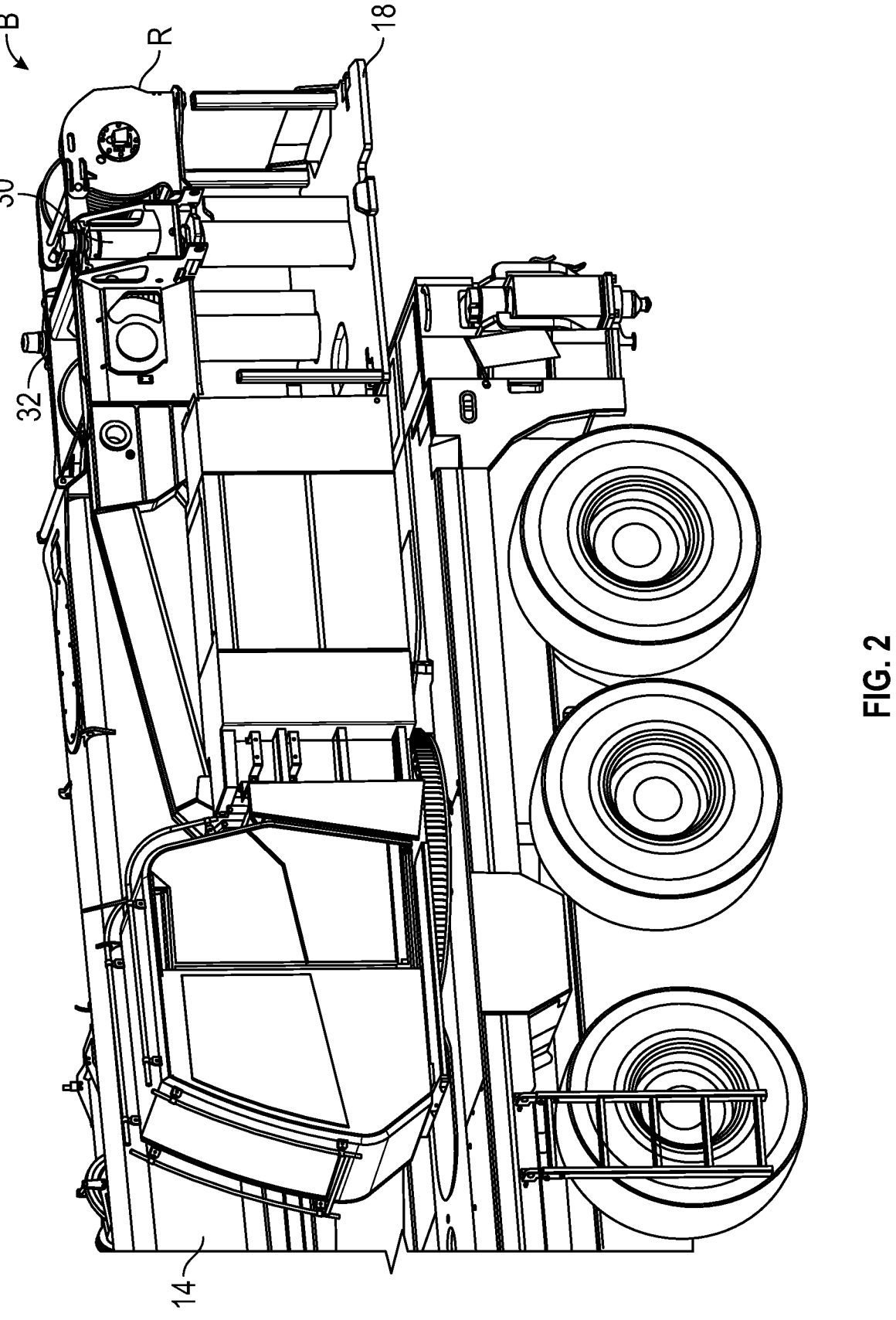
FIG. 2 is a rear view of the crane of FIG. 2.

With continued reference to FIG. 1 as well as to FIG. 2, it can be understood that the base B is adapted for associating with a counterweight to help counteract any load being lifted by the boom assembly 12, such as using the hoist rope H. In the illustrated embodiment, the base B includes a platform or tray 18 adapted for connecting to the rear portion of the base and for receiving a counterweight in the form of one or more plates.

The platform or tray 18 may be connected to the base B by one or more lifters, which may take the form of hydraulically actuated cylinders 30, 32 permanently connected to the base B, but may be disconnected prior to use and supported by an auxiliary structure (such as a carrier, trailer or the like). The cylinders 30, 32 may be actuated by an onboard hydraulic motor. Actuation of the cylinders 30, 32 to raise or lower the tray 18 may be controlled by the operator from the crane cab.

Figures 3, 4:
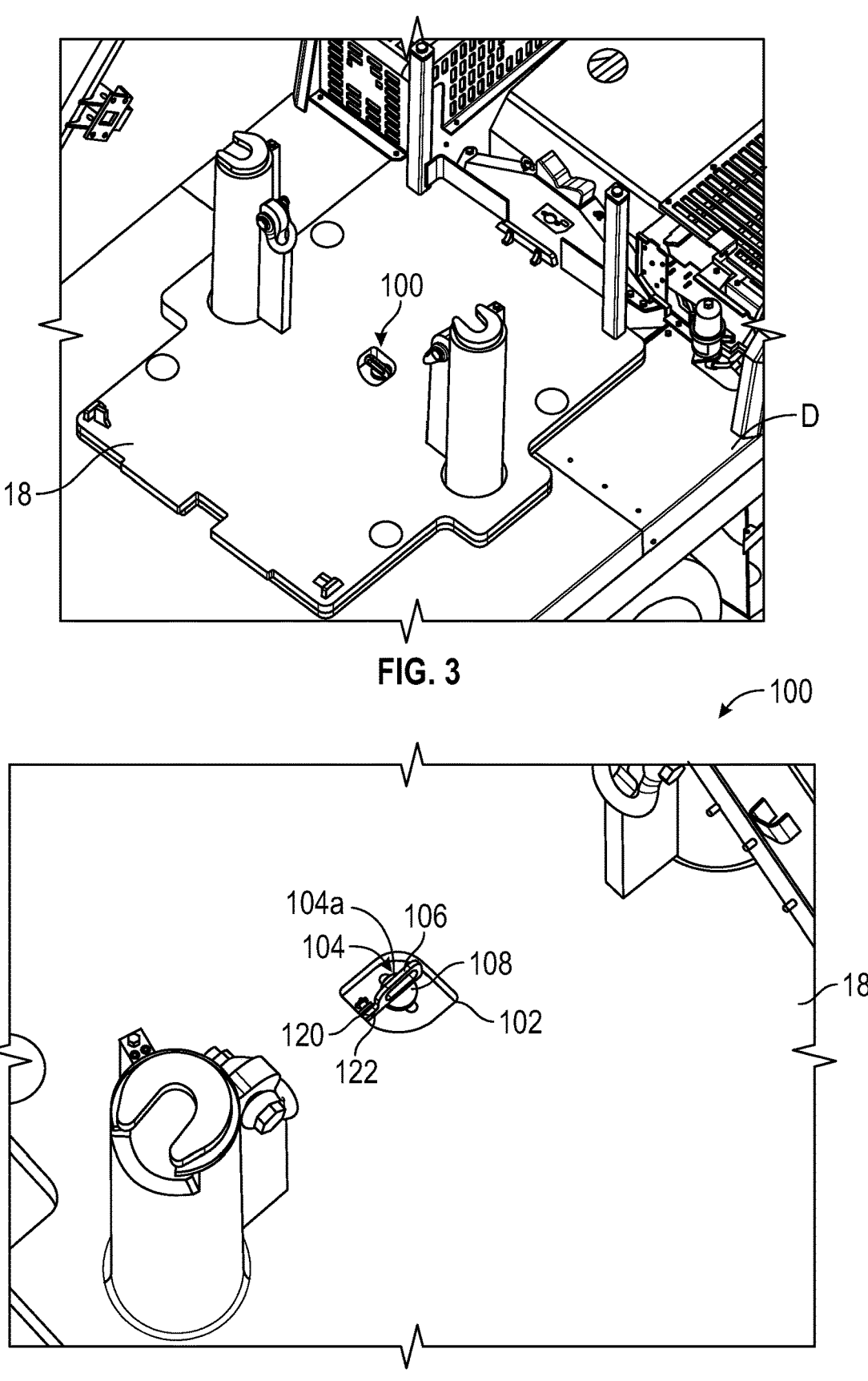
FIG. 3 is a cutaway perspective view of the counterweight tray mounted to a base of the crane.
FIG. 4 is an enlarged view of the arrangement of FIG. 3 with a retainer for the counterweight tray in a first orientation.
Figure 5:
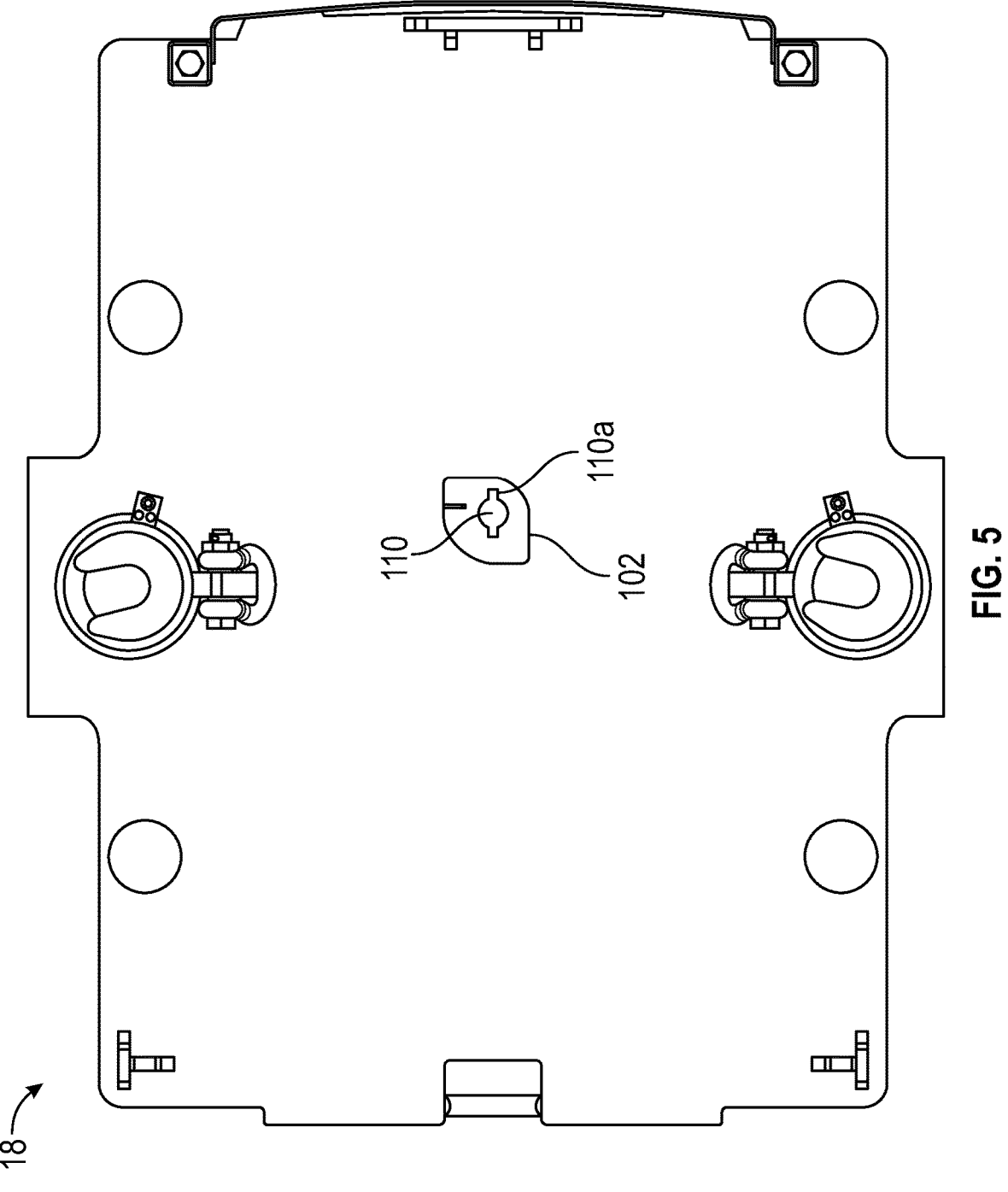
FIG. 5 is a top plan view of the counterweight tray.
Figure 6:
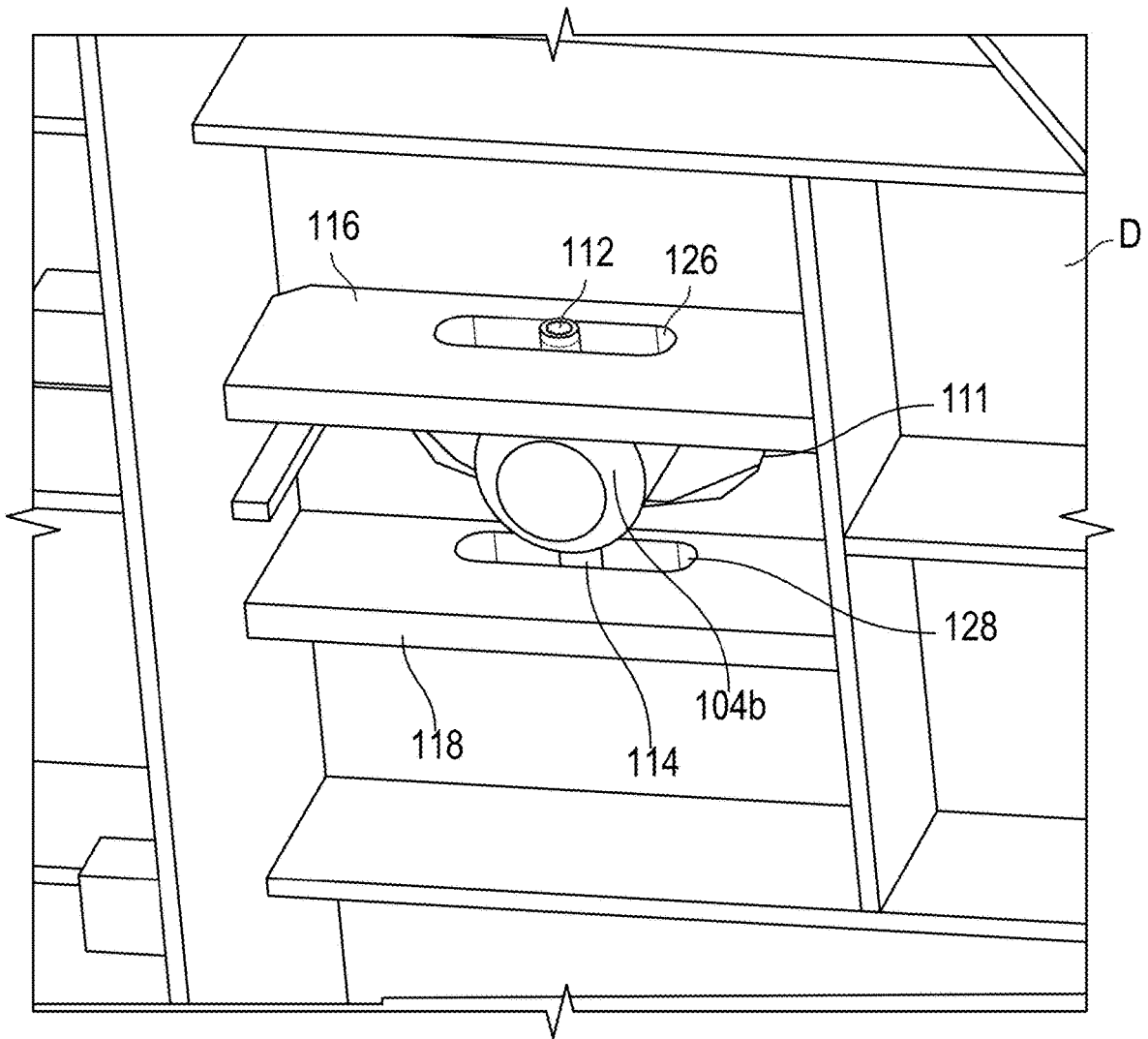
FIG. 6 is an enlarged view of the underside of the base of the crane with the retainer in the first orientation for retaining the counterweight tray.

In accordance with one aspect of the disclosure, and with reference to FIGS. 3-9, a retention system 100 for retaining the counterweight tray 18 to the deck D or other stable support structure of the crane 10 is provided. As shown in FIG. 3, the system 100 comprises an opening 102 in the tray 18 for receiving a retainer 104 for retaining the tray in position on the lifting machine when not in use.

Figure 9:
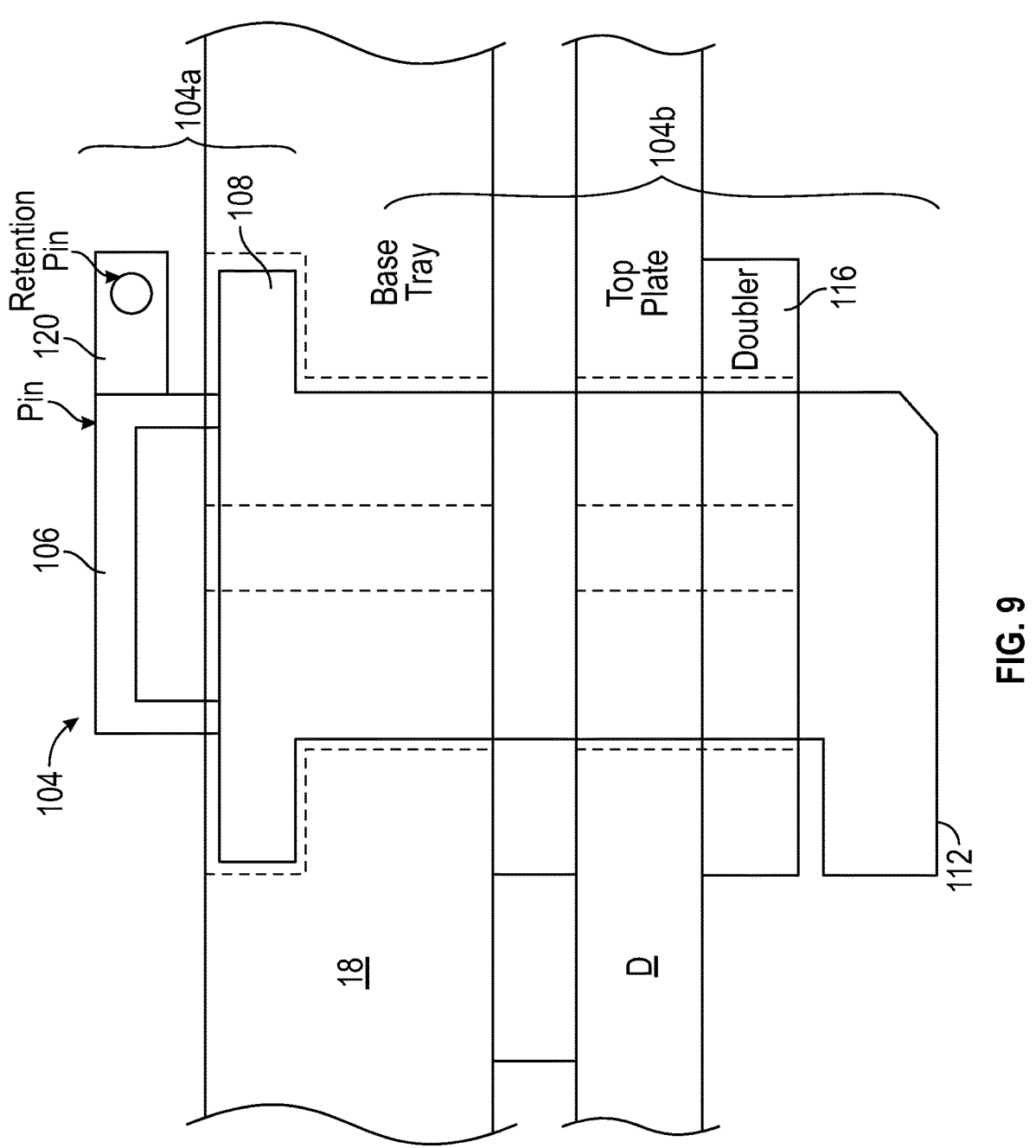
FIG. 9 is a schematic view to illustrate the retention function provided by the retainer in one example.

The retainer 104 includes an upper portion 104*a* having a handle 106 and an oversized portion 108 (see FIG. 9). A lower portion 104*b* of the retainer 104 is adapted to pass through a passage 110 forming part of the opening 102 in tray 18, such as in a central portion, and includes at least one, and preferably two opposed lugs 112, 114. The oversized portion 108 of the retainer 104 prevents it from passing through the opening 110. As perhaps best understood from Figure the opening 110 may include a slot 110*a* having a dimension sufficient to allow for only the lower portion 104*b* of the retainer 104 to pass when the lugs 112, 114 are aligned accordingly.

When the retainer 104 is thus rotated into a first, locked position, which may be perpendicular to a longitudinal axis of the crane 10, the lugs 112, 114 extend through an opening 111 in the deck D in one orientation (which opening may be similarly shaped to opening 110). The retainer 104 may then be rotated into engagement with members 116, 118, termed "doublers," connected to the underside of the deck D. In particular, the engagement may be such that the lugs 112, 114 pass into longitudinally extending slots 126, 128 formed in the members 116, 118. As can be appreciated from the illustration, an upper portion of the opening 102 may be shaped strategically, such that the retainer 104 can only be rotated in one direction to create the locked condition.

Figure 7:
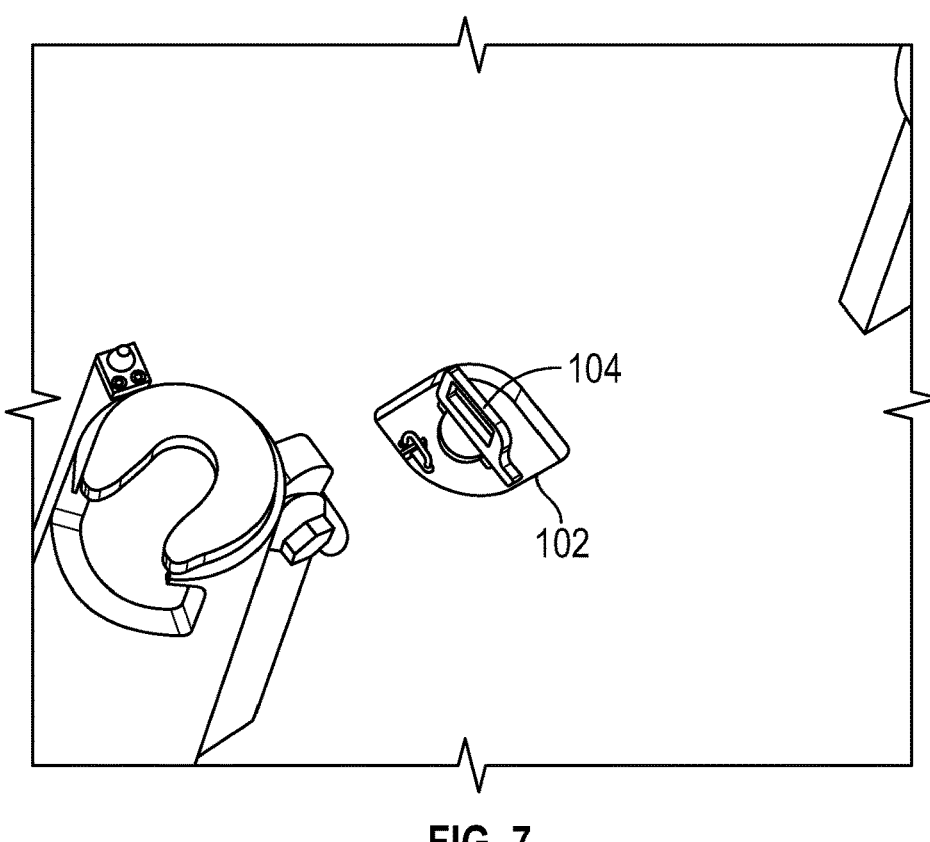
FIG. 7 is an enlarged view of the arrangement of FIG. 3 with a retainer for the counterweight tray in a second orientation.
Figure 8:
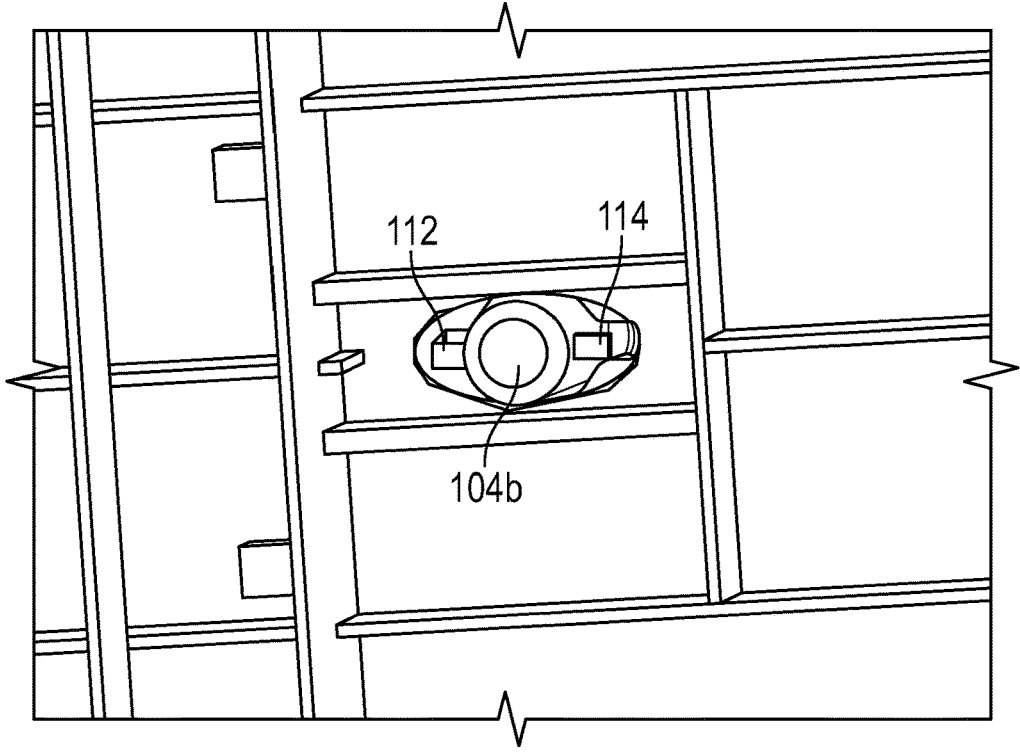
FIG. 8 is an enlarged view of the underside of the base of the crane with the retainer in the second orientation for releasing the counterweight tray.

The tray 18 may also be provided with means for securing the retainer 104 in the locked condition. For example, as shown in FIG. 4, a tab 120 is provided for receiving a locking pin 122 passing through a portion of the retainer 104, such as a portion projecting from the handle 106. The engagement of the locking pin 122 with a suitable opening in the tab 120 thus secures the retainer 104 in the locked position. Turning to FIGS. 7, 8, and 9 when release of the tray 18 is desired, the retainer 104 may be unlocked, such as by removing the pin 122. The retainer 104 may then be rotated (counterclockwise in the illustrated version) to cause the lugs 112, 114 to withdraw from the slots 126, 128 formed in the members 116, 118, as shown in FIG. 8. Again, the shape of the opening 110 may be such that rotation in only one direction is permitted.

In any case, once the retainer 104 is rotated to the unlocked position, the tray 18 is thus released from engagement with the deck D. Removal and storage of the retainer 104 should then be completed. The tray 18 may then be associated with the base B, and the operation of the crane 10 may proceed in the usual manner.

As can be appreciated, the retention system 100 thus provides for a simple yet effective manner of securing the counterweight tray 18 in place on the lifting machine when not in use, such as during over-the-road transport. A single central connection may be used, which avoids the need for multiple points of connection. The retainer 104 employed is simple in construction, and easy to use to deploy to achieve the desired locking engagement and retention or release. A minimum number of parts are required, thus helping to avoid loss and reduce the chance of damage.

The foregoing description of certain embodiments provides an illustration of the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A system for supporting a counterweight, comprising:
   a lifting machine having a deck including a rotatable superstructure including a boom;
   a counterweight tray for supporting the counterweight; and
   a retainer adapted for connecting the counterweight tray to the deck of the lifting machine in one orientation and releasing the counterweight tray from the deck of the lifting machine in another orientation, wherein the retainer is adapted for receiving a locking pin.

2. The system of claim 1, wherein the retainer includes an oversized portion adapted for engaging the counterweight tray when another portion of the retainer is passed through the counterweight tray.

3. The system of claim 1, wherein the lifting machine is a crane.

4. The system of claim 1, the retainer including one or more lugs.

5. The system of claim 1, the retainer including two opposed lugs.

6. The system of claim 5, wherein the two opposed lugs are provided on a lower portion of the retainer and adapted to extend into a corresponding slot associated with the deck of the lifting machine to secure the counterweight tray to the lifting machine.

7. The system of claim 1, wherein an upper portion of the retainer includes a handle.

8. A retention system for supporting a counterweight on a lifting machine, comprising:
   a counterweight tray including an opening; and
   a retainer adapted for passing through the opening in the counterweight tray in one orientation and being retained to the counterweight tray in another orientation, wherein the retainer includes a projection adapted for receiving a locking pin.

9. The retention system of claim 8, wherein the retainer includes an oversized portion adapted for engaging the counterweight tray when another portion of the retainer is passed through the opening in the counterweight tray.

10. The retention system of claim 8, wherein the lifting machine is a crane.

11. The retention system of claim 8, wherein the opening is located centrally on the counterweight tray.

12. The retention system of claim 8, wherein at least a portion of the opening is shaped to allow for rotation of the retainer in only one direction.

13. The retention system of claim 8, wherein the retainer forms a single point of retention for the counterweight tray.

14. The retention system of claim 8, the retainer including one or more lugs.

15. The retention system of claim 14, wherein the one or more lugs comprise two opposed lugs provided on a lower portion of the retainer and adapted to fit within a corresponding slot associated with a deck of the lifting machine.

16. The retention system of claim 8, wherein an upper portion of the retainer includes a handle.

\* \* \* \* \*